United States Patent [19]
Irie et al.

[11] Patent Number: 5,982,413
[45] Date of Patent: Nov. 9, 1999

[54] MIXED ANALOG-DIGITAL SERVICE DISTRIBUTION SYSTEM AND METHOD

[75] Inventors: Toshio Irie; Tetsuo Tachibana; Toshiyuki Hijikata; Tatsuru Nakagaki; Masayuki Yamanaka, all of Kawasaki; Katsutoshi Inoko, Yokohama; Hiroyuki Suzuki, Kawasaki, all of Japan

[73] Assignee: Fujitsu Limited, Kawasaki, Japan

[21] Appl. No.: 08/627,127

[22] Filed: Apr. 3, 1996

[30] Foreign Application Priority Data

May 1, 1995 [JP] Japan ................................ 7-107280

[51] Int. Cl.⁶ .................................................. H04N 7/10
[52] U.S. Cl. ..................................... 348/7; 348/10; 348/6
[58] Field of Search ................................... 348/6, 7, 8, 9, 348/10, 13, 17, 12, 388, 461

[56] References Cited

U.S. PATENT DOCUMENTS

| | | | |
|---|---|---|---|
| 4,805,014 | 2/1989 | Sahara et al. | 348/6 |
| 5,181,106 | 1/1993 | Sutherland | 348/6 |
| 5,347,304 | 9/1994 | Moura et al. | 348/17 |
| 5,488,413 | 1/1996 | Elder et al. | 348/10 |
| 5,541,757 | 7/1996 | Fuse et al. | 348/7 |
| 5,553,064 | 9/1996 | Paff et al. | 348/10 |
| 5,557,316 | 9/1996 | Hoarty et al. | 348/7 |
| 5,630,204 | 5/1997 | Hylton et al. | 348/6 |

*Primary Examiner*—Brian L. Casler
*Assistant Examiner*—Luanne P. Din
*Attorney, Agent, or Firm*—Staas & Halsey

[57] ABSTRACT

By transmitting an analog CATV signal output from a CATV-HE (CAble TeleVision-Head End) to an HDT (Host Digital Terminal), an analog transmission channel for transmitting the analog CATV signal to an ONU (Optical Network Unit) is included in a path housing a digital transmission channel for transmitting a digital service signal for individual distribution service to the ONU. Furthermore, a digital service signal for multicast service is modulated and converted into an analog service signal by a modulator in the HDT. Then, the converted signal is mixed with the analog CATV signal, and transmitted to the ONU. Accordingly, each of the ONUs is equipped with only a built-in modulator for modulating the digital service signal for individual distribution service.

11 Claims, 5 Drawing Sheets

MIXED ANALOG-DIGITAL SERVICE DISTRIBUTION SYSTEM AND METHOD

BACKGROUND OF THE INVENTION

1. Field of the Invention

The present invention relates to a service distribution system and method where an analog multicast service such as a cable television service (CATV) and a digital service, such as the NVOD (Near Video-On-Demand) service, are mixed.

2. Description of the Related Art

Due to advances in multimedia and transmission channel technologies, a technique that mixes a conventional analog multicast service network (such as a cable television (CATV) network) with a digital service (such as Video-On-Demand (VOD), Near-Video-On-Demand (NVOD) etc.), whose signal source is digital, and provides each subscriber with the mixed service, is currently under development. If one of the subscribers requests access to a desired video source, the Video-On-Demand service individually provides that subscriber with signals originating from the requested video source. In the meantime, the Near Video-On-Demand service provides a plurality of subscribers with signals originating from a plurality of video sources in a multicasting manner. Therefore, each of a plurality of subscribers can select a desired video source from the plurality of video sources.

FIG. 1 shows the conventional technique for mixing an analog multicast service network with a digital service.

An analog CATV signal sent from a CATV-HE (CAble Television-Head End) 101 is transmitted to ONUs (Optical Network Units) 102 numbering from 1 to n via analog transmission channels included in respective paths 104 numbering from 1 to n. Each of the ONUs 102 distributes the received analog CATV signal to STBs (Set Top Boxes) 103 respectively installed for the plurality of subscribers using coaxial cables. The configuration described above is that of a conventional analog CATV network.

In the meantime, a digital service signal originating from a digital source, not shown in the attached drawings, for providing a digital service such as VOD service, NVOD service, etc., is transmitted to the ONUs 102 numbering from 1 to n via digital transmission channels included in respective paths 107 numbering from 1 to n, after it is received at an HDT (Host Digital Terminal) 106. In each of the ONUs 102, a modulator 108 modulates the above described digital service signal using a modulation method such as QAM, VSB, etc., and converts the modulated signal into an analog service signal. Then, a mixer (MIX) 105 mixes the analog service signal with the analog CATV signal for distribution to the STBs 103 respectively installed for subscribers using coaxial cables.

For the above described conventional technique, however, the route of the analog transmission channel included in the path 104 for transmitting the analog CATV signal from the CATV-HE 101 to each of the ONUs 102, is completely separate from the route of the digital transmission channel included in the path 107 for transmitting the digital service signal from the HDT 106 to each of the ONUs 102. Accordingly, the paths 104 for the analog transmission channels numbering from 1 to n and the paths 107 for the digital transmission channels numbering from 1 to n should be arranged separately. This causes a first problem, which is proliferation in the amount of equipment required, which becomes large.

Additionally, when a digital multicast service signal such as that for NVOD service, etc. is distributed to each subscriber, an identical digital service signal is distributed in a multicasting manner. Accordingly, the identical digital service signal is distributed from the HDT 106 to each of the ONUs 102 numbering from 1 to n. The above described conventional technique has a second problem, which is that a modulator 108, for converting the common digital service signal input via the digital transmission channel included in the respective paths 107 into the common analog service signal, is required for respective ONUs 102, so that the amount of equipment required increases.

SUMMARY OF THE INVENTION

This invention is contrived in consideration of the above described background, and intended to provide a system with which an analog multicast service and a digital service can be efficiently mixed.

First of all, an explanation of the first embodiment is given below.

The service distribution system according to the first embodiment comprises a service signal storage unit (HDT) including a digital service signal storage part and an analog service signal storage part. The digital service signal storage part (digital part) stores digital service signals. The analog service signal storage part (analog part) stores analog service signals for multicast service (analog CATV signals) transmitted from an analog multicast server (CATV-HE).

The service distribution system further comprises a subscriber terminal (ONU), connected to the service signal storage unit via the path including the digital transmission channel for transmitting the digital service signal stored in the digital service signal storage part in the service signal storage unit, and an analog transmission channel for transmitting the analog service signal for multicast service stored in the analog service signal storage part in the service signal storage unit, which includes a modulation part, and an analog service signal mixing part.

The modulation part modulates the digital service signal received from the digital transmission channel included in the above described path, and converts the modulated signal into the analog service signal.

The analog service signal mixing part (mixer) mixes the analog service signal output from the modulation part with the analog service signal for multicast service received from the analog transmission channel included in the above described path, and outputs the mixed signal to the subscribers.

According to the above described first embodiment of the present invention, by transmitting the analog service signal for multicast service sent from the analog multicast server to the service signal storage unit for storing the digital service signals, the analog transmission channel for transmitting the analog service signal for multicast service to the respective subscriber terminals can be included in the path together with the digital transmission channel for transmitting the digital service signal to the subscriber terminals. As a result, the amount of paths, that is, the amount of equipment required, can be reduced.

Next, an explanation of the second embodiment of the present invention is provided below.

The service distribution system according to the second embodiment of the present invention comprises a service signal storage unit (HDT) that includes a digital service signal storage part, a modulation part, an analog service signal storage part, and a mixing part.

The digital service signal storage part (digital part) stores digital service signals.

The modulation part modulates the digital service signal for multicast service among the digital service signals stored in the digital service signal storage part, and converts them into analog service signals for multicast service. As the digital service signal for multicast service, a signal for Near Video-On-Demand service, a digital-image-encoded signal, etc. can be cited.

The analog service signal storage part (analog part) stores the analog service signals for multicast service sent from an analog multicast server (CATV-HE).

The mixing part (mixer) mixes the analog service signal for multicast service stored in the analog service signal storage part with the analog service signal for multicast service output from the modulation part.

The service distribution system according to the second embodiment further comprises a subscriber terminal (ONU), connected to the service signal storage unit via a path including a digital transmission channel for transmitting the digital service signals other than the digital service signal for multicast service among the digital service signals stored in the digital service signal storage part included in the service signal storage unit, and an analog transmission channel for transmitting the analog service signal for multicast service output from the mixing part included in the service signal storage unit, which includes a modulation part and an analog service signal mixing part.

The modulation part modulates the digital service signal received from the digital transmission channel included in the above described path, and converts the modulated signal into the analog service signal.

The analog service signal mixing part (mixer) mixes the analog service signal output from the modulation part with the analog service signal for multicast service received from the analog transmission channel included in the above described path, and outputs the mixed signal to subscribers.

According to the second embodiment of the present invention, in addition to the operations similar to those of the first embodiment, the digital service signal for multicast service, such as a signal for Near Video-On-Demand service, a signal of a realtime image, etc., is modulated and converted into the analog service signal for multicast service by the modulation part, mixed with the analog service signal for multicast service transmitted from the analog multicast server, and transmitted to subscriber terminals.

Accordingly, the only unit each subscriber terminal requires is a built-in modulation part for modulating the digital service signal for individual distribution services such as the VOD service, etc. It means that each of the subscriber terminals does not require a built-in modulation part for modulating the digital service signal for multicast service. As a result, the number of the modulation parts, that is, the amount of equipment required can be reduced.

BRIEF DESCRIPTION OF THE DRAWINGS

One skilled in the art can easily understand the additional features and objects of the present invention from the description of the preferred embodiments and some of the attached drawings. In the drawings.

DESCRIPTION OF THE PREFERRED EMBODIMENTS

Detailed explanations about the preferred embodiments of the present invention are hereinafter provided with reference to the drawings.

The First Preferred Embodiment

Figure 2:
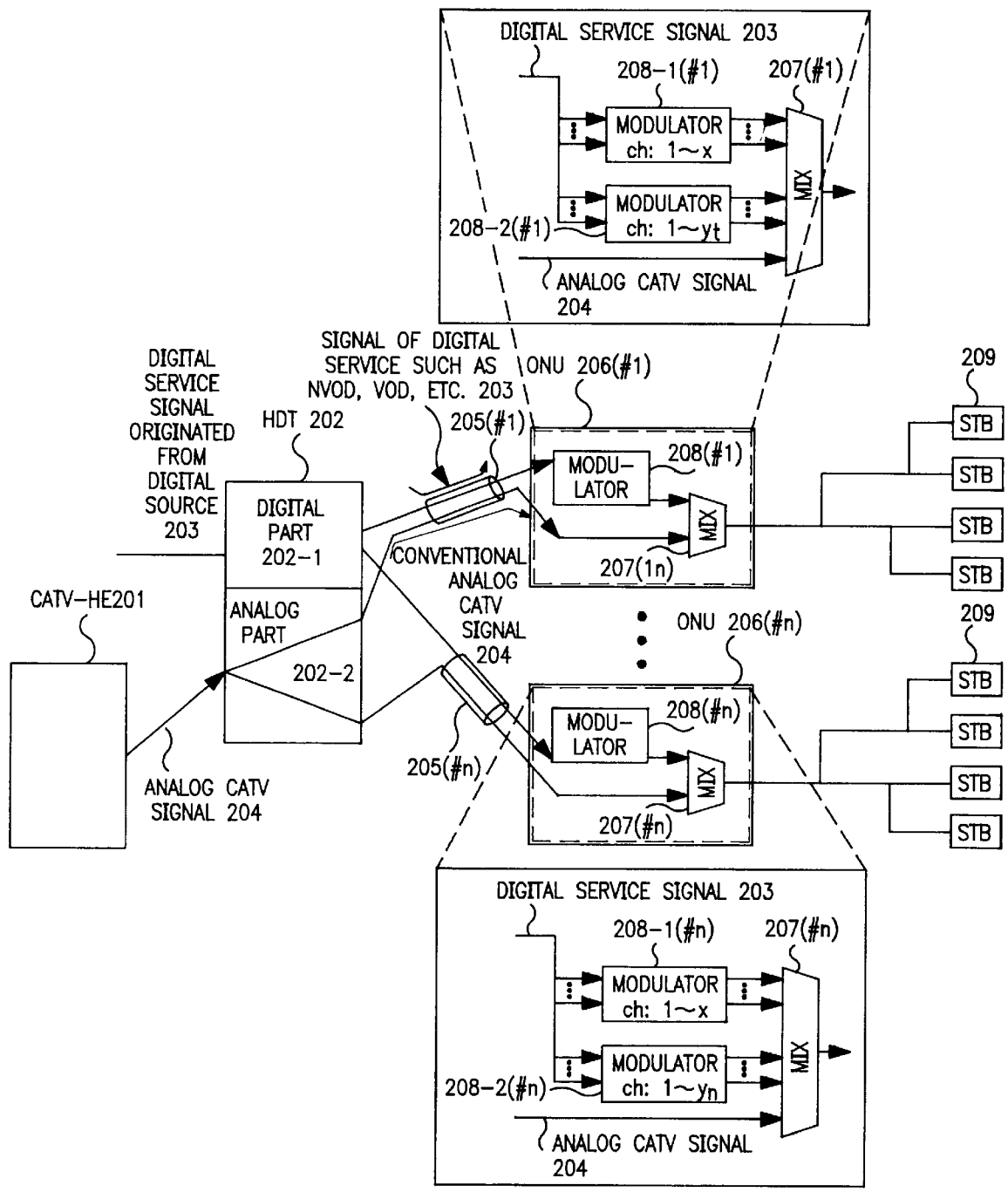
FIG. 2 is a block diagram showing a configuration according to the first preferred embodiment of the present invention.

FIG. 2 is a block diagram showing the configuration according to the first preferred embodiment of the present invention.

After an analog CATV signal 204 sent from a CATV-HE (Cable TeleVision-Head End) 201 is stored in an analog part 202-2 included in an HDT (Host Digital Terminal) 202, it is transmitted to ONUs (Optical Network Units) 206 numbering from 1 to n via an analog transmission channel included in respective paths 205 numbering from 1 to n. Each of the ONUs 206 distributes the received analog CATV signal 204 to STBs 209 respectively installed for a plurality of subscribers via a mixer (MIX) 207 using coaxial cables.

In the meantime, a digital service signal 203 originating from a digital source, not shown in the attached drawings, which provides a digital service such as the VOD service, NVOD service, etc., is stored in a digital part 202-1 included in the HDT 202. Then, it is transmitted to the ONUs 206 numbering from 1 to n via digital transmission channels included in the respective paths 205 numbering from 1 to n. In each of the ONUs 206, the above described digital service signal 203 is modulated with a modulation method such as the QAM method, VSB method, etc., and converted into an analog service signal, by a modulator 208. In this case, the channel for the NVOD service is modulated by a modulator 208-1, and the channel for the VOD service is modulated by a modulator 208-2. The resultant analog service signal output at that time is mixed with the analog CATV signal 204 by the mixer 207, and distributed to the STBs 209 respectively installed for the plurality of subscribers using the coaxial cables.

As the above explanation indicates, in the first preferred embodiment of the present invention, by transmitting the analog CATV signal 204 sent from the CATV-HE 201 to the HDT 202, the paths 205 numbering from 1 to n can include the analog transmission channels numbering from 1 to n for transmitting the analog CATV signal 204 to the HDT 202 together with the digital transmission channels numbering from 1 to n for transmitting the digital service signal 203 to the ONU 206. Accordingly, the number of required paths results in n, which is one half of the number 2n required by the conventional technique shown in FIG. 1. Thus, according to the first embodiment, the amount of equipment required can be reduced.

Furthermore, one HDT 202 includes a large number of ONUs 206 ("n" units for the first embodiment), and the number of HDTs 202 is much smaller than the number of ONUs 206 in a network where the analog multicast service and the digital service are mixed. As a result, the amount of equipment required for accommodating a route for transmitting the analog CATV signal 204 from the CATV-HE 201 to the HDT 202 can be reduced.

In the first preferred embodiment, the number of modulators 208 required for all of the ONUs 206 numbering from 1 to n is obtained as follows:

> The number of modulators 208-1 for the NVOD service channel: the number required for x channels×"n" units (the number of ONUs 206)     (1)
>
> The number of modulators 208-2 for the VOD service channel: the number required for $Y_1$ channel+ . . . +$y_n$ channel     (2)

Figure 1:
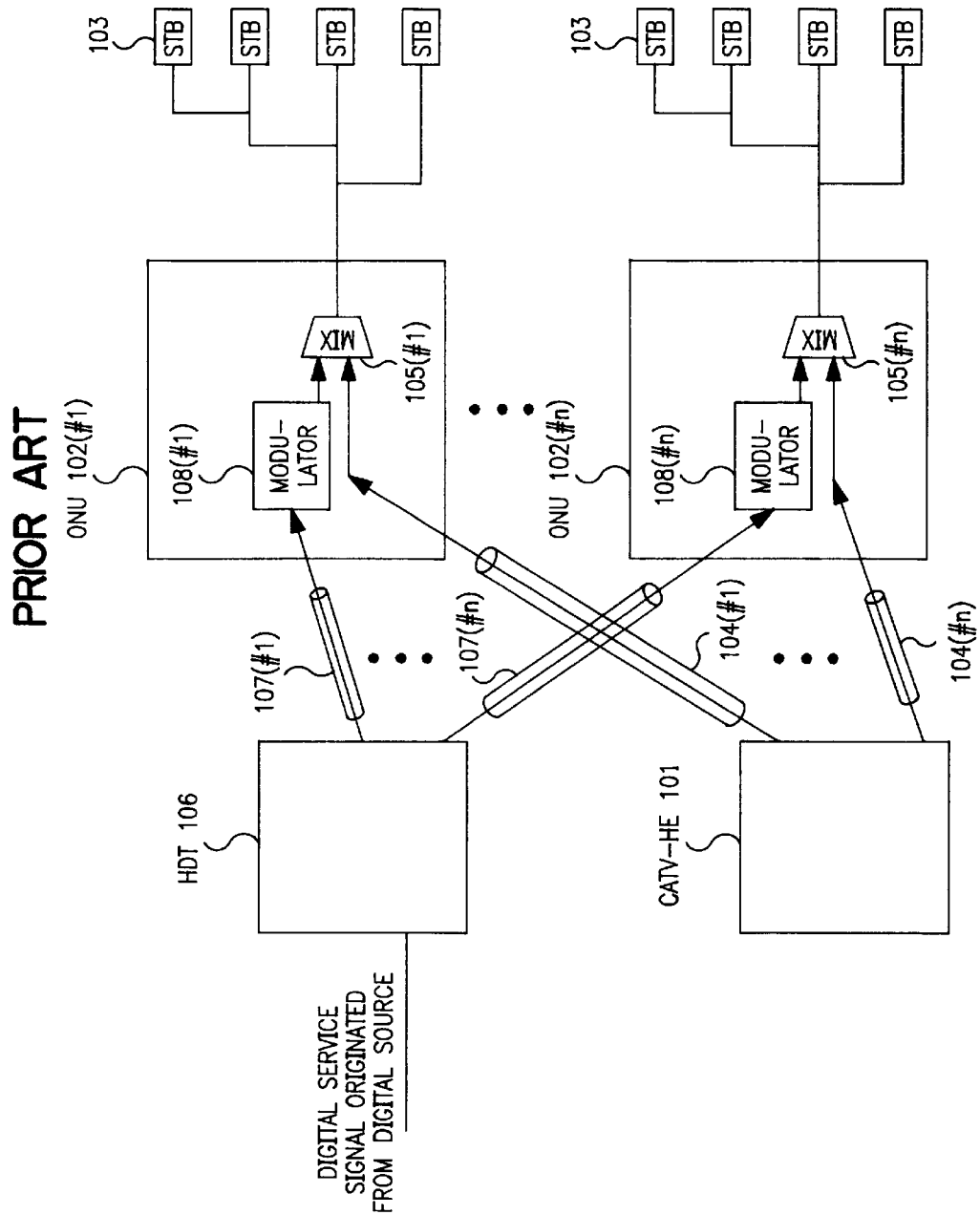
FIG. 1 is a block diagram showing a configuration of the conventional technique.

The total number obtained by adding (1)+(2) is the same as that of the conventional technique shown in FIG. 1.

The Second Preferred Embodiment

Figure 3:
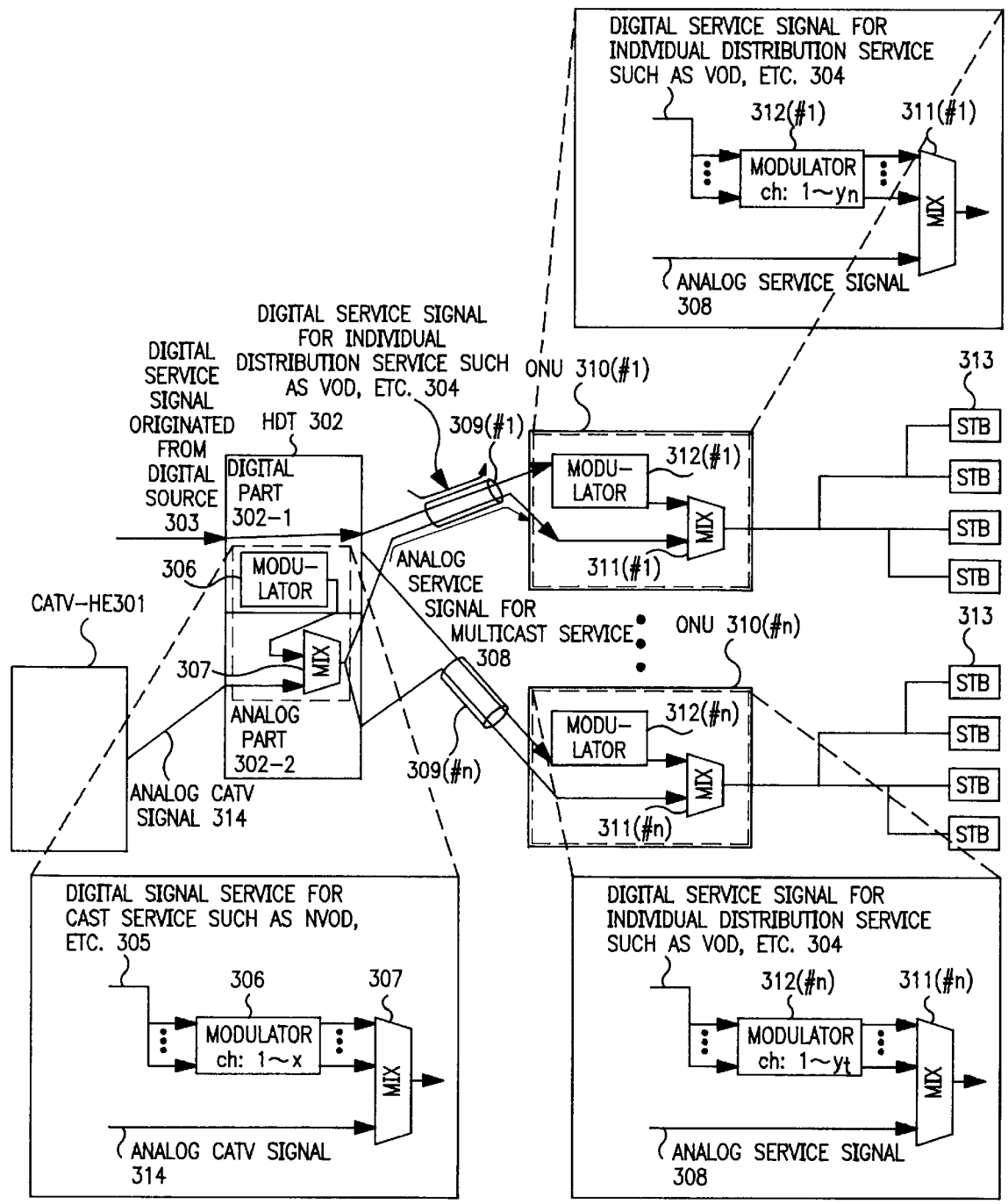
FIG. 3 is a block diagram showing a configuration according to the second preferred embodiment of the present invention.

FIG. 3 is a block diagram showing the configuration according to the second embodiment of the present invention.

An analog CATV signal 314 sent from a CATV-HE 301 is first mixed with an analog service signal output from a modulator 306, to be described later, in a mixer (MIX) 307 in the analog part 302-2 included in the HDT 302. The resultant analog service signal 308 output from the mixer 307 is transmitted to the ONUs 310 numbering from 1 to n via an analog transmission channel included in respective paths 309 numbering from 1 to n. Then, each of the ONUs 310 distributes the received analog service signal 308 to STBs 313 respectively installed for a plurality of subscribers via a mixer (MIX) 311, using coaxial cables.

In the meantime, a digital service signal 304 for individual distribution service to respective subscribers (respective STBs) such as the VOD service, etc. among the digital service signals 303 originating from a digital source, not shown in the attached drawings, is stored in a digital part 302-1 included in the HDT 302. Then, it is transmitted to the ONUs 310 numbering from 1 to n via a digital transmission channel included in the respective paths 309 numbering from 1 to n. In each of the ONUs, the digital service signal 304 for individual distribution service is modulated and converted into an analog service signal 308 by a modulator 312. The resultant analog service signal is mixed with the analog service signal for multicast service 308 by the mixer 311, and distributed to the STBs 313 respectively installed for the plurality of subscribers using the coaxial cables.

The digital service signal for multicast service 305 such as the NVOD service, etc., among the digital service signals 303 originating from the digital source not shown in the attached drawings, is modulated and converted into an analog service signal by the modulator 306 included in the digital part 302-1 within the HDT 302. The converted analog service signal is mixed with the analog CATV signal 314 output from the CATV-HE 301 by the mixer 307. As described above, the resultant analog service signal for multicast service 308 output from the mixer 307 is transmitted to the ONUs 310 numbering from 1 to n via the analog transmission channel included in the respective paths 309 numbering from 1 to n, and then distributed to the STBs 313 respectively installed for a plurality of subscribers.

As the above explanation shows, in the second embodiment as well as in the first embodiment, by transmitting the analog CATV signal 314 sent from the CATV-HE 301 to the HDT 302, analog transmission channels numbering from 1 to n for transmitting the analog CATV signal 314 to the ONUs 310 numbering from 1 to n can be included in the respective paths 309 numbering from 1 to n together with the digital transmission channels. Accordingly, the amount of equipment required can be reduced.

Additionally, according to the second preferred embodiment, a digital service signal for multicast service 305 such as the NVOD service, etc., is modulated and converted into an analog service signal by the modulator 306 in the HDT 302, then mixed with the analog CATV signal 314, and transmitted to the ONUs 310 numbering from 1 to n. Therefore, the only unit each of the ONUs 310 requires is a built-in modulator 312 for modulating the digital service signal 304 for individual distribution service such as the VOD service. This means that the ONU 310 does not require a modulator for modulating digital service signal for multicast service such as the NVOD service like the modulator 208-1 shown in FIG. 2. Specifically, in the second embodiment, the number of required modulators is obtained as follows:

> The number of modulators 306 for the NVOD service channel: the number required for "x" channels×one unit     (3)
>
> The number of modulators 312 for the VOD service channel: the number required for $Y_1$ channel+ . . . +the number required for $Y_n$ channel     (2)

The total number obtained by adding (3) and (2) can be smaller than the number obtained in the first preferred embodiment shown in FIG. 2, by the difference between (3) and (1). Thus, according to the second preferred embodiment, building the modulator for modulating the digital service signal for multicast service 305 such as the NVOD service into the HDT 302 allows the amount of equipment required to be reduced.

The Third Preferred Embodiment

Figure 4:
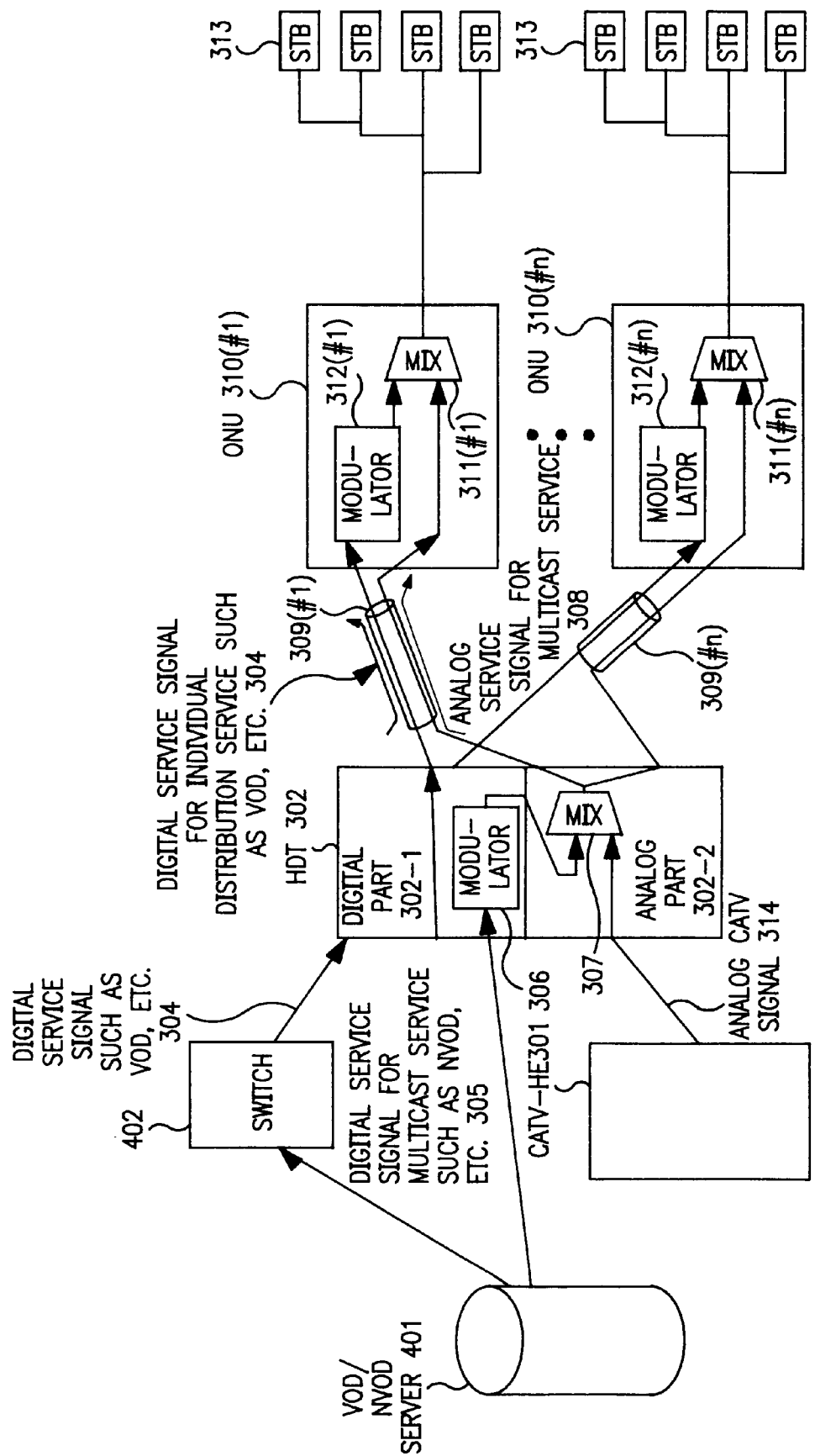
FIG. 4 is a block diagram showing a configuration according to the third preferred embodiment of the present invention.

FIG. 4 is a block diagram showing the configuration according to the third embodiment of the present invention.

The service distribution system according to the third embodiment of the present invention is a system for the VOD/NVOD services remodelled by making the second embodiment more specific.

In the third embodiment, the portions having the same numbers as those of the second embodiment shown in FIG. 3, function in the same manner as in the second embodiment.

In FIG. 4, after the digital service signal for individual distribution service 304, such as the VOD service, etc. of the digital service signals output from a VOD/NVOD server 401, is switched by a switch 402 such as an ATM (Asynchronous Transfer Mode) switch, etc., it is stored in the digital part 302-1 in the HDT 302 in a manner similar to that in the second preferred embodiment, and transmitted to the ONUs 310 numbering from 1 to n via the digital transmission channel included in the respective paths 309 numbering from 1 to n.

Additionally, the NVOD digital service signal 305 of the digital service signals output from the VOD/NVOD server 401 is directly modulated and converted into an analog service signal by the modulator 306 in the digital part 302-1 within the HDT 302, in a manner similar to that in the second preferred embodiment.

In the third preferred embodiment described above, by building the modulator for modulating the digital service signal for the NVOD service 305 into the HDT 302, the amount of equipment required can be reduced in a manner similar to that in the second preferred embodiment.

The Fourth Preferred Embodiment

Figure 5:
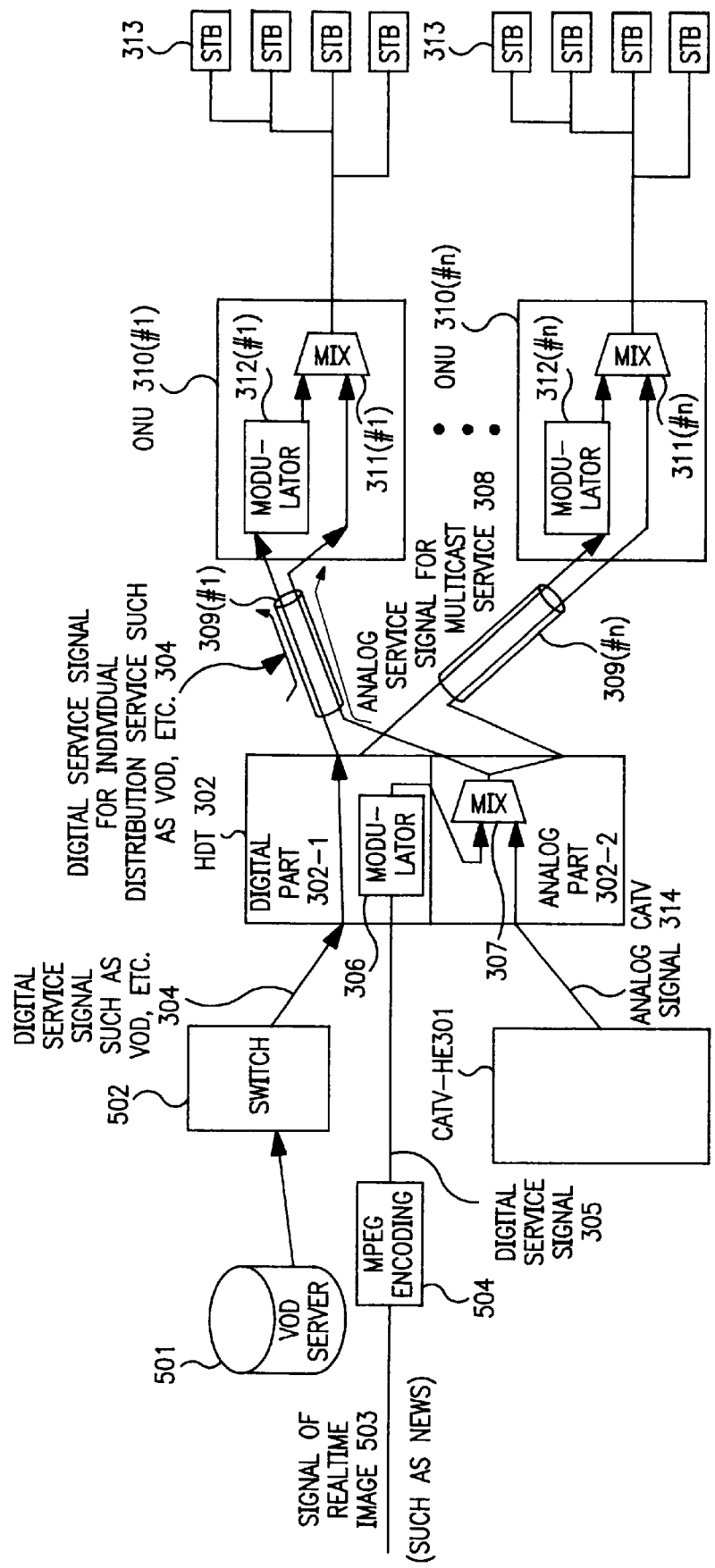
FIG. 5 is a block diagram showing a configuration according to the fourth preferred embodiment of the present invention.

FIG. 5 is a block diagram showing the configuration according to the fourth preferred embodiment of the present invention.

The service distribution system according to the fourth preferred embodiment of the present invention is a VOD service/realtime image feed service remodelled by making the second preferred embodiment shown in FIG. 3 more specific.

In this embodiment, the portions having the same numbers as those of the second embodiment shown in FIG. 3 function in the same manner as in the second embodiment.

In FIG. 5, after the digital service signal 304 for individual distribution service output from a VOD server 501 is switched by a switch 502 such as an ATM switch etc., it is stored in the digital part 302-1 within the HDT 302, and transmitted to the ONUs 310 numbering from 1 to n via the digital transmission channel included in the respective paths 309 numbering from 1 to n, in a manner similar to that in the second preferred embodiment.

Furthermore, a realtime image signal 503, such as a news image, etc. originated from a source not shown in the attached drawings, is compressed and encoded by, for example, an MPEG encoder 504. The resultant digital service signal 305 for multicast service is directly modulated and converted into an analog service signal by the modulator 306 included in the digital part 302-1 within the HDT 302, in a manner similar to that in the second preferred embodiment.

In the fourth embodiment described above, by building the modulator for modulating the digital service signal 305 for multicast service, which is realtime image data, into the HDT 302, the amount of equipment required can be reduced.

In the configuration according to the fourth preferred embodiment, the STB 313 supports the separation of the MPEG-encoded digital service signal from the received analog service signal, decoding it into the original realtime image signal.

What is claimed is:

1. A digital-analog mixed service distribution system, comprising:
   a service signal storage unit including:
   a first storage that stores a plurality of digital service signal,
   a first modulator that modulates a specified digital service signal onto a first modulated signal and converts the first modulated signal into a first analog service signal;
   a second storage that stores at least one second analog service signals for multicast service; and
   a first mixer that mixes at least one of the second analog service signals with the first analog service signal to generate a first mixed signal;
   a path coupled to said service signal storage unit and including a digital transmission channel that transmits at least one digital service signal, and an analog transmission channel that transmits the first mixed signal; and
   a subscriber terminal coupled to said service signal storage unit by said path and receiving the first mixed signal and a digital service signal transmitted thereby, said subscriber terminal including
   a second modulator that modulates the received digital service signal onto a second modulated signal and converts the second modulated signal into a third analog service signal and
   a second mixer that mixes the third analog service signal with the first mixed signal to generate a second mixed signal.

2. The service distribution system according to claim 1, wherein the specified digital service signal is a signal for multicast service.

3. The service distribution system according to claim 2, wherein the signal for multicast service includes one of a signal for a Near-Video-On-Demand service and a signal of a real time image.

4. The service distribution system according to claim 1, wherein the received digital service signal is a signal for individual distribution service.

5. The service distribution system according to claim 4, wherein the signal for individual distribution service includes a signal for a Video-On-Demand service.

6. A method for digital-analog mixed service distribution, comprising the steps of:
   storing a plurality of digital service signals, including a specified digital service signal for multicast service;
   modulating the specified digital service signal onto a first modulated signal;
   converting the first modulated signal into a first analog service signal;
   storing at least one second analog service signal;
   mixing the first analog service signal with the at least one second analog service signal to generate a first mixed signal;
   modulating at least one of the transmitted digital service signals onto as second modulated signal;
   converting the second modulated signal into a third analog service signal; and
   mixing the third analog service signal with the first mixed signal to generate a second mixed signal.

7. The method of claim 6, further comprising:
   transmitting the digital service signals through a digital transmission channel prior to modulating; and
   transmitting the first mixed signal through an analog transmission channel prior to mixing with the third analog service signal.

8. The method of claim 6, wherein the at least one second analog service signals is transmitted from an analog multicast server.

9. The method of claim 6, further comprising the step of outputting the second mixed signal to one or more subscribers.

10. The method of claim 6, wherein the specified digital service signal is a signal for a Video-On-Demand service.

11. A computer-readable medium encoded with a program for digital-analog mixed service distribution, said program comprising the functions of:
   storing one or more digital service signals, including a specified digital service signal for multicast service;
   modulating the specified digital service signal onto a first modulated signal;
   converting the first modulated signal into a first analog service signal;
   storing one or more second analog service signals;
   mixing the first analog service signal with at least one of the second analog service signals to generate a first mixed signal;
   transmitting a first selected signal of the at least one digital service signal and a second selected signal of the at least one first analog signal, the first and second selected signals being transmitted through the same path;
   modulating at least one of the transmitted digital service signals onto a second modulated signal;
   converting the second modulated signal into a third analog service signal; and
   mixing the third analog service signal with the first mixed signal to generate a second mixed signal.

* * * * *